(12) United States Patent
Heinrich et al.

(10) Patent No.: US 6,845,133 B2
(45) Date of Patent: Jan. 18, 2005

(54) METHOD AND DEVICE FOR PROCESSING SIGNALS OF A DIGITAL TRANSMISSION SYSTEM

(75) Inventors: Gerd Heinrich, Buckenhof (DE); Frank Gerhard Ernst Obernosterer, Weissenohe (DE)

(73) Assignee: Lucent Technologies Inc., Murray Hill, NJ (US)

( * ) Notice: Subject to any disclaimer, the term of this patent is extended or adjusted under 35 U.S.C. 154(b) by 792 days.

(21) Appl. No.: 09/755,445

(22) Filed: Jan. 5, 2001

(65) Prior Publication Data

US 2001/0007580 A1 Jul. 12, 2001

(30) Foreign Application Priority Data

Jan. 11, 2000 (EP) .............................................. 00300125

(51) Int. Cl.⁷ .............................. H04B 1/10; H04B 7/212
(52) U.S. Cl. ......................... 375/346; 375/350; 370/347
(58) Field of Search ................................ 375/232, 233, 375/340–350, 295

(56) References Cited

U.S. PATENT DOCUMENTS

| | | | | |
|---|---|---|---|---|
| 5,245,611 A | * | 9/1993 | Ling et al. | 370/347 |
| 5,537,443 A | * | 7/1996 | Yoshino et al. | 375/340 |
| 6,233,276 B1 | * | 5/2001 | Simeon | 375/232 |
| 6,393,068 B1 | * | 5/2002 | Rupp | 375/326 |
| 6,408,022 B1 | * | 6/2002 | Fertner | 375/230 |
| 6,512,789 B1 | * | 1/2003 | Mirfakhraei | 375/229 |
| 6,542,560 B1 | * | 4/2003 | Buehrer et al. | 375/346 |
| 6,567,480 B1 | * | 5/2003 | Brardjanian et al. | 375/331 |
| 6,590,945 B1 | * | 7/2003 | Brardjanian et al. | 375/340 |
| 6,631,175 B2 | * | 10/2003 | Harikumar et al. | 375/350 |
| 6,674,817 B1 | * | 1/2004 | Dolle et al. | 375/342 |
| 2002/0106035 A1 | * | 8/2002 | Harikumar et al. | 375/316 |

FOREIGN PATENT DOCUMENTS

| | | | |
|---|---|---|---|
| EP | 0 512 748 A2 | 4/1992 | H04N/9/64 |
| EP | 0 606 163 A2 | 1/1994 | H04L/27/22 |
| EP | 0 820 171 A1 | 7/1996 | H04L/27/26 |
| WO | WO 96/12367 | 4/1996 | H04L/27/233 |

OTHER PUBLICATIONS

European Search Report, dated Jun. 21, 2000.

* cited by examiner

*Primary Examiner*—Stephen Chin
*Assistant Examiner*—Lawrence B. Williams

(57) ABSTRACT

The invention relates to a method and a device for processing signals of a digital transmission system in general, and for estimating the frequency offset of the transmission system in particular. In one embodiment, the method according to the invention estimates the pulse response of the transmission system and shortens the pulse response by means of a variable prefilter. The duration of the shortened pulse response is, in particular, shorter than the duration of a known symbol sequence which is transmitted twice identically within one method cycle. By comparing samples of the received signal which correspond to the known identical symbols, the frequency offset is estimated reliably, and suitable measures can be taken to compensate it. Consequently, the efficiency of the receiver is substantially improved with respect to the recovery of the transmitted data. The invention can be used, in particular, for transmitting data in blocks, even when there is no freedom from inter-symbol interference, and even when the unshortened pulse response is longer than the known symbol sequence. Transmission using GSM/EDGE systems is one field of application.

20 Claims, 2 Drawing Sheets

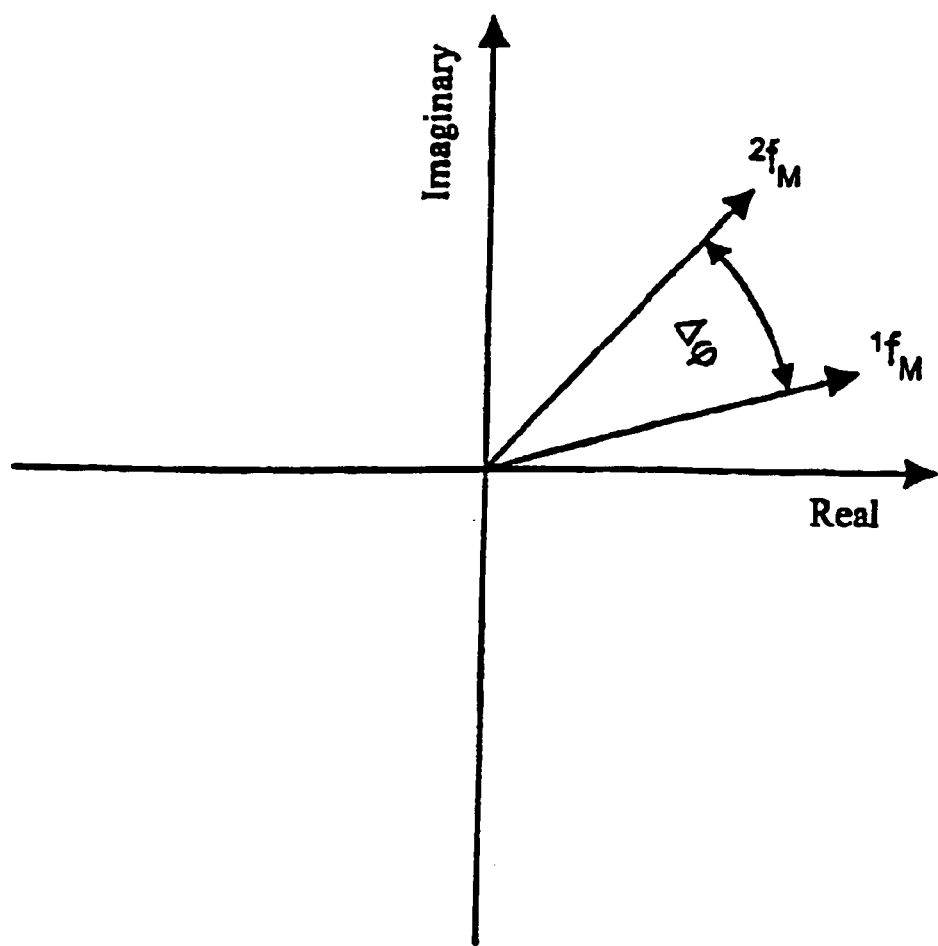

METHOD AND DEVICE FOR PROCESSING SIGNALS OF A DIGITAL TRANSMISSION SYSTEM

CROSS-REFERENCE TO RELATED APPLICATION

This application claims priority of European Patent Application No. 00300125.2, which was filed on Jan. 11, 2000.

BACKGROUND OF THE INVENTION

1. Field of the Invention

The invention relates to a method and a device for processing signals of a digital transmission system in general, and for estimating the frequency offset of the transmission system in particular.

2. Description of the Related Art

Digital transmission techniques by means of electromagnetic signals are of particular interest within the context of a continuously growing need for communication and mobility. The rapidly expanding field of mobile radio represents an important application of such digital transmission techniques. In the case of systems for digital transmission, the transmission is typically performed by modulating a carrier frequency such as, for example, in the case of mobile radio in the global system for mobile communications standard (GSM) or in the enhanced data rates for GSM evolution standard (EDGE), which is based thereon.

In the case of carrier-frequency based digital transmission over dispersive channels, for example over a mobile radio channel, unavoidable deviations occur with real systems between the actual carrier frequency of the received signal and the carrier frequency active in the receiver. Causes for the frequency shifts are, for example, tolerances in the frequency standards, that is to say the local oscillators of the transmitter or the receiver, or frequency shifts owing to local movement of the transmitter or receiver, for example by the so-called Doppler effect. The Doppler effect can be modelled starting from a simple shift in the transmitted frequency (Doppler shift) up to a superimposition of infinitely many, infinitely small received signal components with different frequency shifts (Doppler widening). A frequency offset disadvantageously worsens the efficiency of the receiver with respect to the recovery of the transmitted data sequence. This is likewise disadvantageously expressed in a rise in the bit or block error rate. The frequency offset between the instantaneous carrier frequency of the received signal and the carrier frequency of a coherent receiver can be estimated using known methods given specific assumptions. Once the frequency offset is known, measures may be taken in the receiver which permit compensation of an existing frequency offset, and thus improve the efficiency of the receiver with respect to the recovery of the transmitted data.

An overview of known estimation methods is given, for example, in Mengali, U., D'Andrea, A. N. "Synchronization Techniques for Digital Receivers", Plenum Press, New York, 1997. A theoretically efficient method is known under the designation of "Data Aided Maximum Likelihood Frequency Estimation". However, the said method requires a two-step search algorithm, and is therefore exceptionally laborious computationally. For this reason, the method is unsuitable for practical use.

Also known are already simplified variants of the quoted method which are likewise based on data-aided estimation of the frequency offset. Some of these methods are described, for example, in S. Kay, "A Fast and Accurate Single Frequency Estimator", IEEE Trans. Acoust. Speech, Signal Processing, ASSP-37, p. 1987–1990, December 1989; M. P. Fitz, "Further Results in the Fast Estimation of a Single Frequency", IEEE Trans. Comm., COM-42, p. 862–864, March 1994 and M. Luise, R. Reggiannini, "Carrier Frequency Recovery in All-Digital Modems for Burst-Mode Transmission", IEEE Trans. Comm., COM-43, p. 1169–1178, March 1995. The quoted methods certainly exhibit a relatively good efficiency in conjunction with acceptable complexity, but the extent to which they can be used is subject to substantial limitations. They can only be applied when the transmission system operates with phase modulation (phase shift keying, PSK) and, in addition, the transmission in the overall transmission system is free from inter symbol interference (ISI), that is to say the first Nyquist criterion is fulfilled.

In many practical applications, including the case of frequency-selective fading channels as, for example, in GSM mobile radio, freedom from inter-symbol interference still does not exist.

SUMMARY OF THE INVENTION

Consequently, one object of the invention is to provide a method and a device which permit reliable estimation of the frequency offset of a digital transmission system in conjunction with an acceptable computational outlay.

A further object of the invention is to provide a method and a device which permit estimation even given the presence of significant inter-symbol interference.

A further object of the invention is to provide a method and a device which require no prior information on the transmission channel for estimation.

The objects of the invention are achieved in a surprisingly simple way simply by the method defined in Claim 1 and by the device defined in Claim 13. Advantageous developments of the invention are the subject matter of the subclaims.

In the method according to the invention, a first and a second known, and preferably identical symbol sequence are transmitted in a digital transmission system. Such subsequences with transmitted symbols, known to the receiver in advance, within a data sequence are, for example, training sequences, terminating symbols or tailbits which occur at least twice within the evaluated received signal section. The received signal is preferably available as a so-called equivalent complex baseband signal.

A transmission channel is characterized at every instant by a pulse response. The pulse response essentially represents the allocation protocol of the transmission channel between the transmitted and the received signal. An infinitesimally short signal pulse transmitted at an instant influences the received signal essentially in the temporal length of the pulse response. If the pulse response is longer than the duration of the known symbol sequence, the received signal section corresponding to a known symbol is consequently also influenced at every instant by components of, in particular, unknown symbols before the known symbol sequence. In order to reduce this influence, the square of the absolute value of the pulse response of the transmission system is reduced in a temporal section, so that, preferably, the section of the transmitted signal which essentially influences the received signal is shorter than the first and second known symbol sequence. The square of the absolute value of the pulse response is essentially the square of the absolute value of the voltage caused by the received signal in a receiving device, and is therefore a measure of the energy which is present in temporal sections of the pulse response. The reduction is realized, in particular, by a lowering of the energy of trailing sections of the pulse response by comparison with the energy of the total pulse response, or by a displacement of the energy from trailing into leading sections of the pulse response. It is ensured in this way that at least a first and second section of the received signal, which sections correspond to the first and second known symbol sequence, respectively, are influenced essentially only by the known symbol sequences. The first and second section of the received signal are compared with one another, and the frequency offset is estimated from the result of the comparison.

The described method therefore permits estimation of the frequency offset, in particular in the case of digital transmission systems based on carrier frequency, doing so advantageously even in cases in which the length of the channel pulse response before the reduction exceeds the length of the available symbol sequences known to the receiver. That is to say, the method according to the invention requires no freedom from pulse interference, in particular, and this is very advantageous by comparison with the known methods.

In a preferred development of the invention, the first and second known symbol sequence can be transposed into one another through multiplication by a complex-valued constant, the two symbol sequences being, in particular, identical. In the case of identical symbol sequences, the comparison of the first and second section, which corresponds to the first and second known symbol sequence, respectively, is advantageously particularly simple, and therefore associated with a low computational outlay.

The received signal is preferably sampled in order to obtain for each transmitted symbol at least one corresponding sample which represents the above-described corresponding sections of the received signal. In this development, the frequency offset is preferably estimated or determined approximately from the angular difference or phase difference between a first sample, which corresponds to a symbol from the first sequence, and a second sample, which corresponds to the identical symbol from the second sequence. In particular, those symbols within a known sequence are selected which are situated at least by the length of the pulse response after the beginning of the sequence, in order to ensure that no interference from unknown symbols before the known sequence passes to the samples. The assignment of a sample to the corresponding transmitted symbol section is preferably achieved by synchronization via training sequences.

A typical transmitted signal comprises blocks with repeating pairs of known symbol sequences. The method according to the invention can therefore be applied for each block or cycle, in order to re-estimate the frequency offset for each cycle. This is advantageous since transmission channels vary continuously because, for example, of atmospheric changes or movement of a transmission subscriber, and, according to the invention, it is possible to take cyclically adequate countermeasures to compensate the frequency offset, for example derotation. A particularly precise compensation of the frequency offset including a possibly occurring Doppler shift is achieved when the pulse response of the transmission system is approximately time-invariant within the duration of the cycle considered.

The reduction in the square of the absolute value of the domain of the pulse response is implemented by a filter in an advantageous embodiment. The filter coefficients are determined, in particular, by means of an estimated pulse response, and are preferably re-adapted with each cycle.

In a particularly advantageous embodiment, the filter coefficients are determined and set such that the pulse response is shortened to a length which is shorter than the length of the known symbol sequences.

The method acording to the invention can therefore also be applied for systems with transmission which is not free from interference and in which, therefore, before the reduction or shortening, the pulse responce of the overall system has been longer than a symbol, and/or longer than the spacing between two samples. In a particularly advantageous way, the method can even be applied when the unshortened pulse response is longer than the known symbol sequence.

In an alternative embodiment, the filter used is an all-pass filter. The all-pass filter has, in particular, the property of varying essentially the phase-frequency response of the complex-valued received signal.

The all-pass filter is advantageously selected such that the resulting pulse response is of low phase and, in the most favourable way of minimum phase. As a result, the energy components within the pulse response are displaced to a large extent into the first coefficients, without in the process varying the absolute value frequency response of the system and thus the signal-to-noise ratio. Consequently, in conjunction with an unchanged length of the pulse response, a similarly advantageous effect is achieved as by shortening the pulse response. Also advantageous is the combination of a prefilter with the all-pass filter, as a result of which it is possible to realize a compromise, which is favourable for the respective application, between shortening the pulse response and an essentially unchanged signal-to-noise ratio.

The method according to the invention can be applied to virtually all linear modulation methods, for example phase shift keying (PSK), quadrature amplitude modulation (QAM) or amplitude shift keying (ASK), and to approximately linear modulation methods, for example gaussian minimum shift keying (GMSK). The method has also proved to be advantageous for transmission systems with blockwise data transmission, for example GSM standard and/or EDGE standard.

Under specific boundary conditions, the method described therefore permits more accurate estimation of the frequency offset, in particular, from a baseband signal in carrier-frequency digital transmission systems, for example GSM standard, than in the case of known methods, and therefore permits a partially substantial increase in the efficiency of the receiving device in conjunction with suitable measures for compensating the frequency offset.

This holds, in particular, for blockwise data transmission as in the case of most mobile radio standards, for example GSM, for which blockwise estimation of the frequency offset is advantageous because of the properties of the transmission channel which vary strongly within a few blocks, for example owing to a high speed of movement of a transmission subscriber.

The device according to the invention is defined by features analogous to the method features, and therefore has similar advantages.

BRIEF DESCRIPTION OF THE DRAWINGS

The invention is explained in more detail below with the aid of exemplary embodiments and with reference to the drawings, in which:

FIG. 3 shows an angular difference between two samples in the complex plane.

DETAILED DESCRIPTION

The present invention relates to a method and a device for processing signals of a digital transmission system for the purpose of reliably estimating the frequency offset of the transmission system. For this purpose, the pulse response is estimated and shortened in one exemplary embodiment. The invention is particularly advantageous for digital signal transmission in mobile radio systems.

Figure 1:
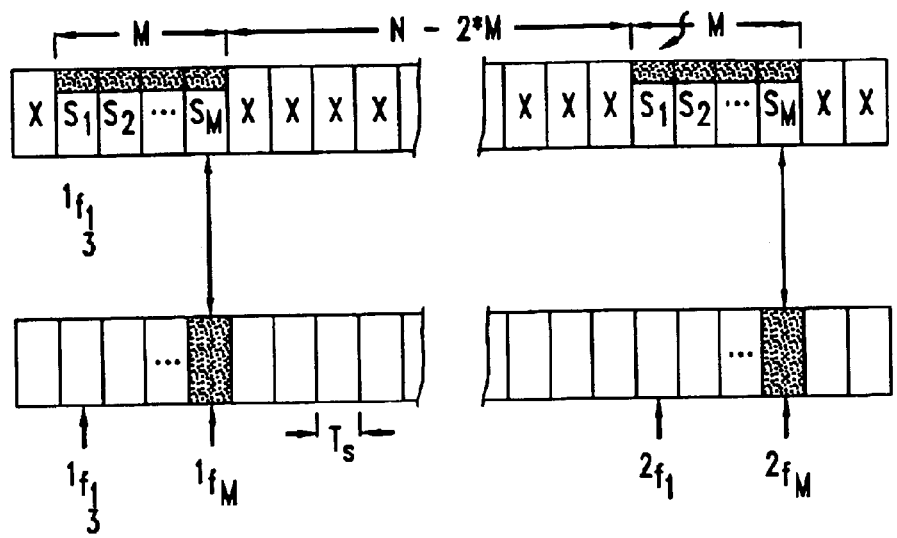
FIG. 1 shows an example of a symbol sequence of a transmitted signal with the corresponding samples of the received signal.

In the exemplary embodiments described below, the transmitted symbol sequence comprises consecutive blocks with in each case N symbols, as illustrated in FIG. 1. A block comprises a subsequence of M known symbols $\{s_1, s_2, \ldots, s_M\}$ and a data sequence of N−2*M of generally unknown symbols x. The known subsequence follows thereupon in the next block, and so on. The received signal is present in the baseband as a consequence of time-discrete complex samples
$\{\ldots {}^1f_1, {}^1f_2, \ldots, {}^1f_M, {}^1f_{M+1}, {}^1f_{M+2}, \ldots, {}^1f_N, {}^2f_1, {}^2f_2, \ldots, {}^2f_M, {}^2f_{M+1}, {}^2f_{M+2}, \ldots\}$
at the spacing $T_9$. This is achieved, for example, by sampling an analog baseband signal at the symbol clock frequency. As a result, the length of a symbol is essentially equal to the length of a sampling interval. In this case, the sample ${}^1f_1$ corresponds to the transmitted symbol $s_1$, ${}^1f_M$ corresponds to $s_M$, ${}^2f_1$ corresponds to the transmitted symbol $s_1$ of the first repetition of the subsequence, ${}^2f_M$ corresponds to $s_M$, and so on. A higher sampling frequency, that is to say oversampling, is also possible, but for the sake of clarity this will not be considered here in any more detail.

Furthermore, the length of the unshortened pulse response of the overall transmission system may be defined relative to the signal r by the number $L_h$ of sample coefficients. In this case, r stands for the time-discrete, complex-valued baseband representation of the received signal.

If the transmission is free from inter-symbol interference, that is to say $L_h=1$, in the noise-free case the angular difference of each pair of samples $({}^2f_1-{}^1f_1)$, $({}^2f_2-{}^1f_2)$, ..., $({}^2f_M-{}^1f_M)$, which correspond to the known symbols, is proportional to the frequency offset ΔF. This precondition, which is necessary for the accuracy of estimation and the imaging accuracy of known methods, is frequently not fulfilled in practice, that is to say $L_h>1$. Frequently, not even the substantially weaker condition $L_h \leq M$ is fulfilled.

For the case where $L_h>M$, as well, the method according to the invention is capable of carrying out reliable estimation by subjecting the signal to a suitable linear prefiltering. In this case, the filter is selected such that the length of the pulse response is shortened by the filtering to a value $\hat{L}_h$, with the result that $\hat{L}_h \leq M$, $\hat{L}_h$ representing the number of coefficients of the shortened pulse response. In order to illustrate the advantages according to the invention, a pulse response is therefore assumed for the exemplary transmission system which is longer when unshortened than the length of the known symbol sequence, that is to say it is assumed that $L_h>M$.

Figure 2:
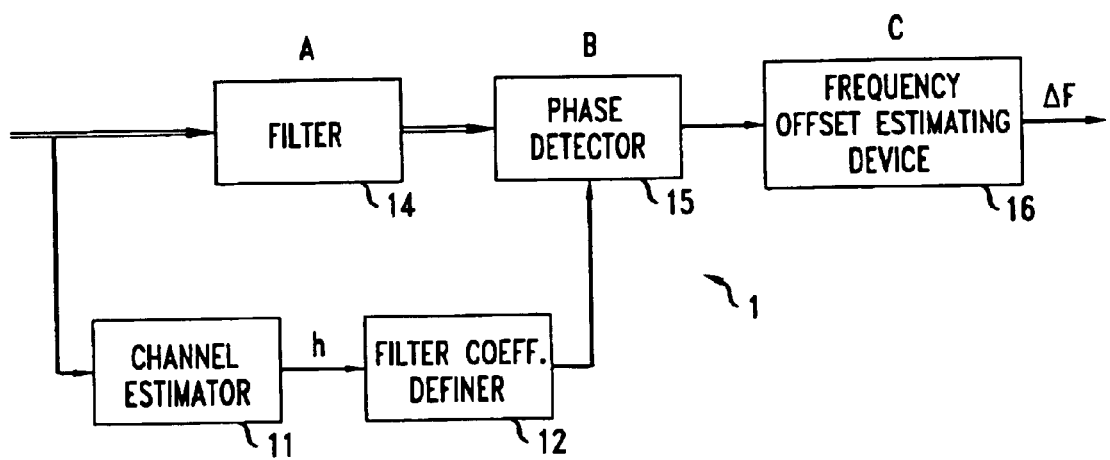
FIG. 2 shows a block diagram of a preferred embodiment of the invention.

FIG. 2 shows a block diagram of the device 1 according to the invention. The figure can also be understood analogously as a flow chart of the method according to the invention. The reference symbols A, B, C characterize the method steps.

A received baseband signal r is represented which is divided between a filter 14, whose coefficients are defined by the filter coefficient definer 12, and a pulse response or channel estimator 11. The channel estimator 11 provides the estimated pulse response h and transmits the latter to a filter coefficient definer 12.

In a step A, prefiltering is applied to a baseband signal r with the aid of a filter or prefilter 14 and shortens the resulting pulse response of the equivalent overall transmission system to the length $\hat{L}_h \leq M$. In order to shorten the pulse response, use is made, for example, of known methods as described in the following articles: W. H. Gerstacker, J. B. Huber, "Maximum SNR Decision-Feedback Equalization with FIR Filters: Filter Optimization and a Signal Processing Application", Proceedings of International Conference on Communications (ICC) 1996, pages 1188–1192 Dallas, June 1996, Wolfgang H. Gerstacker and Johannes B. Huber, "Improved Equalization for GSM Mobile Communications", Proceedings of International Conference on Telecommunications (ICT) 1996, pages 128–131, Istanbul, April 1996 or K. D. Kammeyer, "Time Truncation of Channel Impulse Responses by Linear Filtering: A Method to Reduce the Complexity of Viterbi Equalization", International Journal of Electronics and Communications (AEÜ), 48(5), pages 237–243, 1994. The contents of the foregoing articles are hereby incorporated in full in the subject matter of the disclosure of this description.

The first step in designing a suitable recursive or non-recursive prefilter 14 is to estimate the pulse response h of the overall transmission system. Starting from the estimated pulse response h, the coefficient definer 12 determines suitable filter coefficients for shortening the pulse response and transfers the coefficients to the filter 14.

Instead of the variable prefilter 14, an alternative embodiment comprises an all-pass filter for prefiltering. This is designed such that the resulting pulse response of the transmission system is of minimum phase.

The mode of operation of an all-pass filter is described, for example, in the printed publications A. V. Oppenheim, R. W. Schafer, "Zeitdiskrete Signalverarbeitung" ["Time-discrete signal processing"], Oldenbourg Verlag, Munich, Vienna, 1992 and H. W. Schüßler, "Digitale Signalverarbeitung 1" ["Digital signal processing 1"], 4th edition, Springer Verlag, Berlin, Heidelberg, New York, 1994, the contents of which are hereby incorporated in full in the subject matter of the disclosure of this description.

In a step B, a phase detector 15 is used to determine the angular difference between two suitable complex-valued samples of the filtered received signal f. The selection of the samples is illustrated in FIG. 1 for the case $\hat{L}_h=M$. If $\hat{L}_h=M$, the two samples ${}^1f_M$ and ${}^2f_M$ are selected which correspond to the respectively last symbol $s_M$ of the subsequences $\{s_1, s_2, \ldots, s_M\}$ known in advance to the receiver. This is performed by a suitable synchronization, for example with the aid of training sequences. Subsequently, the angular difference Δφ between the selected samples is determined, as illustrated in FIG. 3. The two vectors shown in FIG. 3 represent the two samples ${}^1f_M$ and ${}^2f_M$ in the complex plane. For $\hat{L}_h<M$, it is even possible to evaluate the angular difference of $(M-\hat{L}_n+1)$ pairs of values, and to form an average value therefrom. The averaging increases the accuracy of the determination of angular difference.

In a step C, the frequency offset ΔF is estimated by means of an estimating device 16 from the above-determined angular difference Δφ in accordance with $$\Delta F = \frac{\Delta\varphi}{2\pi \cdot N \cdot T_s}$$

ΔF being the estimated frequency offset,
N being the spacing of the two known subsequences in symbols, and
$T_s$ being the period of the symbol clock.

The described method therefore permits the unique estimation of the frequency offset ΔF for the noise-free case in a domain of $$\Delta F \in \left[-\frac{1}{2 \cdot N \cdot T_s}, \ldots, 0, \ldots, +\frac{1}{2 \cdot N \cdot T_s}\right].$$

The foregoing condition is usually fulfilled for the said fields of application, but it is also possible to use an additional rough synchronization, which is to be used in advance, to fulfil the condition.

Furthermore, the method according to the invention is very robust against errors in pulse response estimation, since the estimated pulse response is used exclusively to calculate the prefilter 14. Possible phase errors in the coefficients of the estimated pulse response have, for example, no effect on the estimation of the frequency offset ΔF, and a good accuracy of estimation is achieved for the frequency offset ΔF.

One field of application for the described method is the GSM/EDGE mobile radio standard. According to the standard, three edge symbols each, so-called tail symbols, which are known to the receiver, are appended at both ends to the sequence of the symbols which are to be transmitted in blocks. Consequently, the frequency offset ΔF can be estimated with good accuracy only when the pulse response does not exceed a length of three sampling intervals. However, since the pulse responses occurring in the case of GSM/EDGE frequently clearly exceed a length of three coefficients, the advantages of the described method and of the device for shortening the pulse response come into play here especially.

It is clear to the person skilled in the art that the previously described shortening of the pulse response is to be understood by way of example. In many fields of application, it is sufficient to reduce the square of the absolute value of a part of the pulse response, for example relative to the square of the absolute value of the overall pulse response, in order to reduce, in particular to minimize, the influences of unknown symbols on the received sections to be compared.

What is claimed is:

1. A method for a digital transmission system, in which a first and second known symbol sequence are transmitted, the frequency offset of the transmission system is estimated by comparing a first section of the received signal corresponding to the first symbol sequence with a second section of the received signal corresponding to the second symbol sequence, and the square of the absolute value of a pulse response of the transmission system is reduced in a time domain in order to lessen the influence of symbols adjacent to the first or second known symbol sequence on the first and second sections respectively, of the received signal, wherein the energy of a domain of the pulse response of the transmission system relative to the total energy of the pulse response is reduced with the aid of an all-pass filter, and wherein the all-pass filter is adapted to achieve a low-phase pulse response of the transmission system.

2. The method according to claim 1, wherein the first and second symbol sequence are selected to be identical to one another.

3. The method according to claim 1 or 2, wherein the reduction in the square of the absolute value of the domain of the pulse response of the transmission system is undertaken with the aid of a filter.

4. The method according to claim 3, wherein a the pulse response of the transmission system is estimated.

5. The method according to claim 4, wherein coefficients of the filter are determined and/or adapted by means of the estimated pulse response.

6. The method according to claim 1, wherein the pulse response is shortened.

7. The method according to claim 1, wherein one value of the first and second sections of the received signal is determined by sampling the received signal.

8. The method according to claim 7, wherein the angular difference in the complex plane between the first and second samples is used to estimate the frequency offset.

9. The method according to claim 8, wherein several pairs of samples are averaged over the angular differences.

10. The method according to claim 9, wherein the signals are transmitted in blocks.

11. A device for a digital transmission system, comprising a transmitting device for transmitting a first and a second known symbol sequence, and means for comparing a first section of the received signal corresponding to the first symbol sequence with a second section of the received signal corresponding to the second symbol sequence from which the frequency offset of the transmission system is estimated, characterized in that the device comprises a first module for reducing the square of the absolute value of a pulse response of the transmission system in a time domain in order to lessen the influence of symbols adjacent to the first or second known symbol sequence on the first and second section respectively, of the received signal wherein the first module comprises an all-pass filter, and wherein the all-pass filter is adapted to achieve a low-phase pulse response of the transmission system.

12. The device according to claim 11, wherein the first and second symbol sequence are identical to one another.

13. The device according to claim 11 or 12, wherein the first module comprises a filter.

14. The device according to claim 13, further comprising a second module for estimating a pulse response.

15. The device according to claim 14, further comprising a third module for determining and/or adapting suitable coefficients of the filter.

16. The device according to claim 11 wherein the pulse response is shortened by means of the first module.

17. The device according to claim 11, further comprising a sampling device for the received signal with the aid of which one value of the first and second section of the received signal can be sampled.

18. The device according to claim 17, further comprising means for estimating the frequency offset from the angular difference in the complex plane between the first and second sample.

19. The device according to claim 18, further comprising means for determining an average value of the angular differences of several pairs of samples.

20. The device according to claim 19, wherein the device is adapted for transmission in blocks.

* * * * *